United States Patent [19]
Fujita et al.

[11] 3,926,796
[45] Dec. 16, 1975

[54] PREPARATION OF ACTIVATED SLUDGE AND TREATMENT OF WASTE WATER THEREWITH

[75] Inventors: Yukio Fujita, Yamadanishi; Iwao Kawasaki, Kurashiki; Hideo Nishikawa, Toyonaka, all of Japan

[73] Assignee: Nippon Gohsei Kagaku Kogyo Kabushiki Kaisha, Osaka, Japan

[22] Filed: Sept. 23, 1974

[21] Appl. No.: 508,142

[30] Foreign Application Priority Data
Sept. 25, 1973 Japan............................ 48-108182

[52] U.S. Cl. ................................. 210/11
[51] Int. Cl.² ........................................ C02C 1/06
[58] Field of Search............ 210/11, 18, 15, 2, 3, 4, 210/6, 7, 24, 46

[56] References Cited
UNITED STATES PATENTS

| | | | |
|---|---|---|---|
| 3,356,609 | 12/1967 | Bruemmer | 210/11 |
| 3,401,113 | 9/1968 | Pruessner et al. | 210/11 |
| 3,660,278 | 5/1972 | Mimura et al. | 210/11 |
| 3,769,164 | 10/1973 | Azarowicz | 210/11 |

*Primary Examiner*—Charles N. Hart
*Assistant Examiner*—Benoit Castel
*Attorney, Agent, or Firm*—Armstrong, Nikaido & Wegner

[57] ABSTRACT

Preparation of an activated sludge capable of assimilating polyvinyl alcohol resins included in waste water by subjecting an ordinary activated sludge to acclimation in an aqueous solution in the presence of specific amount of polyvinyl alcohol resins and a specific kind of nutrients. In acclimation, the amount of the polyvinyl alcohol resins is increased stepwise from less amount to more amount every 85 % or more drop of the chemical oxygen demand of the aqueous solution.

The acclimation can be completed in such a short period as 4 to 20 days. The waste water effluent including polyvinyl alcohol resins can be treated by passing through said activated sludge with a high efficiency.

5 Claims, No Drawings

PREPARATION OF ACTIVATED SLUDGE AND TREATMENT OF WASTE WATER THEREWITH

BACKGROUND OF THE INVENTION

The present invention relates to an acclimation of an activated sludge, more particularly to a process for preparing the activated sludge capable of assimilating polyvinyl alcohol resins effectively. The present invention also relates to a process for treating a waste water including polyvinyl alcohol resins with the acclimated, activated sludge.

Polyvinyl alcohol resins are useful water-soluble polymer having excellent characteristics and have been widely employed in various uses.

It has been recognized that polyvinyl alcohol resins generally give a colorless, transparent aqueous solution which is physiologically harmless. Therefore, even if a small amount of polyvinyl alcohol resins is discharged into a river in a form of a dilute aqueous solution, actual harm is not recognized. However, in some cases, all of the employed resin is discharged into waste water, chemical oxygen demand (hereinafter referred to as "COD") of the waste water considerably increases. Therefore, it is desirable to remove or decompose polyvinyl alcohol resins in such a waste water prior to discharge into a river or sea. As a treatment for removing polyvinyl alcohol resins in such a waste water, a biological treatment is more preferable than a chemical treatment since it is inexpensive and does not give secondary pollution.

Hitherto, it has been generally known that an activated sludge has essentially a function of assimilating polyvinyl alcohol resins, but the rate of assimilation is substantially so small except that the specific kind of modified polyvinyl alcohol that an activated sludge treatment is not practical for waste water including the resin. That is to say, an ordinary activated sludge from such as sewage treatment plant or textile waste water treatment plant can assimilate certain modified polyvinyl alcohol resin, but it takes more than 30 days till the activated sludge possesses a practical capability of assimilating the resin in the former case, and more than 40 days in the latter case.

OBJECTS OF THE INVENTION

It is an object of the present invention to provide a novel process for preparing an activated sludge capable of assimilating polyvinyl alcohol resins.

A further object of the invention is to provide an efficient process for acclimating an activated sludge in a short period, being capable of decomposing polyvinyl alcohol resins.

A still further object of the invention is to provide a process for treating a waste water including polyvinyl alcohol resins by means of the activated sludge.

These and other objects of the invention will become apparent from the description hereinafter.

DETAILED DESCRIPTION

It has now been found that an activated sludge capable of decomposing polyvinyl alcohol resins in a waste water can be prepared in a short period by subjecting an ordinary activated sludge to acclimation under specific conditions.

According to the present invention, the acclimation of activated sludge can be completed in such a short period as 4 to 20 days, and thus prepared activated sludge can surely and in a short time assimilate polyvinyl alcohol resins in a waste water. Furthermore, in the enforcement of the instant process, any secondary pollution does not occur and, therefore, its contributions to industry and environmental preservation are really great.

According to the present invention, the acclimation of an ordinary activated sludge is carried out in an aqueous solution including a polyvinyl alcohol resin in an amount of 0.005 to 0.6 kg./kg.MLSS/day (MLSS means mixed liquor suspended solid), and at least one nutrient mentioned after in the range of biochemical oxygen demand (hereinafter referred to as "BOD") loading of 0.05 to 0.3 kg./kg.MLSS/day. When a comparatively low activity is sufficient for the activated sludge to treat a waste water, the acclimation is carried out under a low loading of the polyvinyl alcohol resin and completed at the time the COD of the aqueous solution decreases to less than 15% of the initial one. When the high activity is desired, the acclimation is carried out stepwise by increasing stepwise the amount of the polyvinyl alcohol resin from less amount to more amount within the above-mentioned range every 85% or more drop of the COD of the aqueous solution.

COD in the present invention is determined by potassium permanganate method.

Nutrients employed in the present invention are selected from the group consisting of acetic acid, propionic acid, potassium, sodium, calcium or ammonium salts thereof, methyl, ethyl, propyl or butyl esters thereof, amides thereof, malic acid, citric acid, fumaric acid, oxalic acid and lactic acid. In particular, potassium acetate, sodium acetate, ammonium acetate are preferably employed alone or in a mixture thereof since the propagation of the sludge microorganism active to the polyvinyl alcohol resins can be especially accelerated.

The activated sludge employed in the present invention is not limited. Any known activated sludge used in sewage treatment plant or waste water treatments from textile plant, chemical plant and food plant can be employed.

A concentrationn of an activated sludge in the acclimation system is usually selected from the range of 2,000 to 8,000 p.p.m. and the acclimation is generally carried out in a usual activated sludge treatment apparatus, for instance, an aeration tank under conditions of a temperature of 15° to 35°C., pH 7.0 to 8.5 and dissolved oxygen 1 to 6 p.p.m., with agitation. The residence time of the solution in an apparatus is for 5 to 15 hours.

The acclimation is carried out not only in the aqueous solution prepared by adding a polyvinyl alcohol resin and nutrient to water, but also in a waste water including a polyvinyl alcohol resin which should be treated. In case of carrying out the acclimation in the waste water, the waste water is diluted to satisfy the above-mentioned conditions.

Examples of the polyvinyl alcohol resins employed in the present invention are polyvinyl alcohol having not less than 70% by mole of a degree of hydrolysis, water-soluble acetalized polyvinyl alcohol, water-soluble urethanated polyvinyl alcohol, water-soluble hydrolyzed copolymer of vinyl acetate and an olefin such as ethylene or propylene, water-soluble hydrolyzed copolymer of vinyl acetate and maleic acid, crotonic acid, acrylic acid acrylic amide or an another unsaturated carboxylic acid, partially acetalizated one of the above hydrolyzed copolymers, urethanated one of the above hydrolyzed copolymers, and the like. These resins are employed alone or in a mixture thereof. The same polyvinyl alcohol resin as that in a waste water to be treated is preferably employed.

According to the present invention, it is essential to keep BOD loading of nutrients in the range of 0.05 to 0.3 kg./kg.MLSS/day during the acclimation. In case of being less than the above-mentioned range, the propagation rate of the sludge microorganism in acclimation drops, and on the other hand, in case of being more than the above-mentioned range, the propagation of the sludge microorganism increases but the assimilating activity of the prepared activated sludge remarkably decreases.

In addition to polyvinyl alcohol resins and nutrients as a carbon source, other nutrients such as nitrogen, phosphate and potassium are added to the aqueous solution in the same manner as a conventional activated sldge treatment. In general, the ratio of nitrogen and phosphate to 100 kg./kg. MLSS/day of BOD are 5 and 1, respectively. As the nitrogen source, ammonium sulfate, ammonium nitrate or urea is generally employed. As the phosphate source and potassium source, potassium dihydrogenphosphate or dipotassium hydrogenphosphate is generally employed.

In every step of the acclimation, as the activated sludge assimilates a polyvinyl alcohol resin in the aqueous solution COD of the solution decreases. When the COD of the solution decreases to less than 15% of that at the beginning of each acclimation, the polyvinyl alcohol resin is added. Additional amount of the polyvinyl alcohol resin is increased step by step, but limited at most to 0.6 kg./kg.MLSS/day.

In the final step of the acclimation, a concentration of polyvinyl alcohol resin in the aqueous solution is preferably selected in the same or a little higher level to that in the waste water to be treated. For instance, when the concentration of polyvinyl alcohol in a waste water to be treated is 700 p.p.m., an activated sludge is acclimated in the aqueous solution of which polyvinyl alcohol concentration is increased in four steps, e.g. 50 p.p.m., 100 p.p.m., 200 p.p.m., 400 p.p.m. and 700 p.p.m. Thus, by increasing stepwise the polyvinyl alcohol concentration up to at least 700 p.p.m., the activated sludge having high activity of assimilating the resin can be prepared in a short time.

After the conclusion of the acclimation, the acclimated sludge is recovered as a high concentration sludge by settling it in such an apparatus as a settling tank.

Various waste water including a polyvinyl alcohol resin such a desizing waste water can be treated by passing through the activated sludge thus prepared. The conditions of the treatment are similar to that of the acclimation in the activated sludge treatment of a waste water, the presence of nutrients is not necessary but a small amount of nutrients is preferable to make assimilation activity of the sludge steady. Usually, a waste water can be treated for 5 to 15 hours.

The present invention is more particularly described and explained by means of the following illustrative Examples.

EXAMPLE 1

A 40 liter aeration tank of a treatment apparatus equipped with the aeration tank and a 5 liter settling tank was charged with 25 liters of an aqueous solution including 1,000 p.p.m. of sodium acetate (of which BOD loading was 0.21 kg./kg.MLSS/day), 69 p.p.m. of urea, 26 p.p.m. of potassium dihydrogenphosphate and 50 p.p.m. of polyvinyl alcohol (degree of polymerization: 1,700, degree of hydrolysis: 87% by mole) (of which BOD loading was 0.01 kg./kg.MLSS/day) and 5,000 p.p.m. of the acivated sludge out of the industrial waste water treatment (Mizushima Factory, Nippon Gohsei Kagaku Kogyo Kabushiki Kaisha, at Okayama-ken, Japan). Then the aeration was carried out at a rate of 255 liter/hour at a normal temperature, while the aqueous solution was continuously supplied to the aeration tank at a rate of 1.1 liters/hour. The residence time in the aeration tank was 8 hours. The COD of the aqueous solution after three days from the beginning of the first acclimation decreased to 2 p.p.m. from 42 p.p.m. of initial COD.

Then, the second acclimation was successively carried out under the same condition as the above except that the polyvinyl alcohol concentration of the aqueous solution was 100 p.p.m., of which COD was 84 p.p.m. After three days, the COD of the aqueous solution in the settling tank dropped to 4 p.p.m.

Further, the third acclimation was carried out under the polyvinyl alcohol concentration of 300 p.p.m. The COD of the aqueous solution supplied was 252 p.p.m. After four days, the COD of the aqueous solution in the settling tank dropped to 4 p.p.m.

Finally, the fourth acclimation was carried out under the polyvinyl alcohol concentration of 500 p.p.m. The COD of the aqueous solution was 420 p.p.m. After three days, the COD of the aqueous solution in the settling tank dropped to 5 p.p.m. and also the polyvinyl alcohol concentration was 6 p.p.m. The acclimation was finished, and the activated sludge was recovered in the settling tank.

Then an aqueous solution including 500 p.p.m. of polyvinyl alcohol (degree of polymerization: 1,700, degree of hydrolysis: 87% by mole), 1,000 p.p.m. of sodium acetate, 70 p.p.m. of urea and 26 p.p.m. of potassium dihydrogenphosphate was treated in the presence of 5,000 p.p.m. of the above activated sludge at a temperature of about 20°C. for one month in the same manner as in the acclimation. The polyvinyl alcohol concentration of the treated liquid was maintained 5 to 10 p.p.m. and the COD of the treated liquid decreased to 3 to 7% of the initial COD.

EXAMPLES 2 TO 21

The acclimation was carried out in four steps in the same manner as in Example 1 except that each nutrients as shown in Table 1 was employed.

Table 1 was given to show the kind and the amount of nutrients and COD drop with elapse of time.

Table 1

| Example No. | 2 | | 3 | 4 | 5 |
|---|---|---|---|---|---|
| Nutritive substance | | | | | |
| Kind | Methyl acetate | | Ethyl acetate | Calcium acetate | Acetic amide |
| BOD loading (kg./kg. MLSS/ | 0.1 | 0.25 | 0.15 | 0.05 | 0.20 |

Table 1-continued

| Example No. | 2 | 3 | 4 | 5 |
|---|---|---|---|---|
| day) | | | | |
| State of COD drop | | | | |
| First acclimation under 50 p.p.m. of PVA | | | | |
|   After 1 day (p.p.m.) | 13 | 12 | 13 | 10 | 15 |
|   After 3 days (p.p.m.) | 2 | 2 | 3 | 1 | 3 |
|   After 4 days (p.p.m.) | — | — | — | — | 2 |
| Second acclimation under 100 p.p.m. of PVA | | | | |
|   After 1 day (p.p.m.) | 6 | 7 | 7 | 4 | 10 |
|   After 2 days (p.p.m.) | 2 | 2 | 2 | 1 | 4 |
|   After 3 days (p.p.m.) | — | — | — | — | — |
| Third acclimation under 300 p.p.m. of PVA | | | | |
|   After 1 day (p.p.m.) | 15 | 15 | 18 | 12 | 21 |
|   After 2 days (p.p.m.) | 6 | 3 | 6 | 3 | 15 |
|   After 3 days (p.p.m.) | — | — | — | — | 9 |
| Fourth acclimation under 500 p.p.m. of PVA | | | | |
|   After 1 day (p.p.m.) | 30 | 25 | 37 | 15 | 25 |
|   After 3 days (p.p.m.) | 10 | 55 | 5 | 6 | 14 |
|   After 5 days (p.p.m.) | — | — | — | — | — |
| Total acclimation period (day) | 10 | 10 | 10 | 10 | 12 |

| Example No. | 6 | 7 | 8 | 9 | 10 | 11 |
|---|---|---|---|---|---|---|
| Nutritive substance | | | | | | |
|   Kind | Malic acid | Sodium citrate | Fumaric acid | Oxalic acid | Lactic acid | Propionic acid |
|   BOD loading (kg./kg. MLSS/day) | 0.05 | 0.10 | 0.15 | 0.20 | 0.20 | 0.15 |
| State of COD drop | | | | | | |
| First acclimation under 50 p.p.m. of PVA | | | | | | |
|   After 1 day (p.p.m.) | 12 | 9 | 14 | 15 | 14 | 15 |
|   After 3 days (p.p.m.) | 4 | 3 | 10 | 10 | 7 | 10 |
|   After 4 days (p.p.m.) | 2 | 2 | 3 | 3 | 2 | 3 |
| Second acclimation under 100 p.p.m. of PVA | | | | | | |
|   After 1 day (p.p.m.) | 8 | 6 | 7 | 7 | 6 | 10 |
|   After 2 days (p.p.m.) | 2 | 2 | 6 | 6 | 4 | 8 |
|   After 3 days (p.p.m.) | — | — | 5 | 5 | — | 6 |
| Third acclimation under 300 p.p.m. of PVA | | | | | | |
|   After 1 day (p.p.m.) | 18 | 15 | 21 | 21 | 18 | 21 |
|   After 2 days (p.p.m.) | 9 | 6 | 12 | 15 | 9 | 18 |
|   After 3 days (p.p.m.) | 6 | 3 | 9 | 12 | 6 | 15 |
| Fourth acclimation under 500 p.p.m. of PVA | | | | | | |
|   After 1 day (p.p.m.) | 23 | 20 | 35 | 35 | 30 | 41 |
|   After 3 days (p.p.m.) | 14 | 9 | 17 | 22 | 18 | 21 |
|   After 5 days (p.p.m.) | — | — | — | — | — | 17 |
| Total acclimation period (day) | 12 | 12 | 13 | 13 | 12 | 15 |

EXAMPLE 12

A waste water including polyvinyl alcohol from a polystyrene manufacturing plant (of which COD was 500 p.p.m. and polyvinyl alcohol content was 400 p.p.m. and in which polyvinyl alcohol was used as an emulsifier) was diluted to four times, and thereto sodium acetate, calcium acetate, urea and potassium dihydrogenphosphate were added in concentrations of 250 p.p.m., 250 p.p.m., 70 p.p.m. and 25 p.p.m., respectively. The COD of the waste water so prepared was 84 p.p.m.

The first acclimation was carried out in the same manner as in Example 1 except that the above waste water was employed instead of the aqueous solution and the activated sludge was added to the aeration tank in a concentration of 3,000 p.p.m. After three days, the COD of the waste water dropped to 10 p.p.m. and the polyvinyl alcohol concentration was 10 p.p.m.

The further two stage acclimations were successively carried out with supplying into the aeration tank the waste waters prepared by the same manner as the above except that the waste water was diluted to 200 p.p.m. and 400 p.p.m. in polyvinyl alcohol concentration, respectively. In the former stage, namely the second acclimation, the initial COD 170 p.p.m. dropped to 5 p.p.m. two days after and the polyvinyl alcohol concentration was 6 p.p.m. In the latter stage, namely the third acclimation, the initial COD 340 p.p.m. dropped to 7 p.p.m. three days after and the polyvinyl alcohol concentration was 8 p.p.m. At this stage, it was regarded that the activated sludge had been acclimated.

Successively, the waste water was treated by supplying it to the aeration tank at a rate of 0.9 liter/hour. The residence time in the aeration tank was 9 hours. The treatment was continued for two months. During the treatment, the polyvinyl alcohol concentration in the treated waste water was within the range of 30 to 10 p.p.m.

EXAMPLE 13

The acclimation was carried out in the same manner as in Example 1 except that the activated sludge from a sewage treatment plant was employed.

At the first stage of the acclimation, seven days were required till 50 p.p.m. of the polyvinyl alcohol concentration dropped to 5 p.p.m., but thereafter each acclimation at each stage was completed for the same days as in Example 1. Thus, the activated sludge capable of assimilating polyvinyl alcohol was obtained in 18 days.

EXAMPLE 14

The acclimation was carried out in the same manner as in Example 1 except that hydrolyzed vinyl acetate-monomethyl maleate copolymer (vinyl acetate content: 98% by mole, degree of hydrolysis in vinyl acetate unit: 91% by mole) was included in the aqueous solution instead of polylinyl alcohol.

At the first acclimation, the concentration of the hydrolyzed copolymer dropped to 1 p.p.m. from 50 p.p.m. for 3 days. At the second acclimation, the concentration dropped to 5 p.p.m. from 100 p.p.m. for 3 days. At the third acclimation, the concentration dropped to 15 p.p.m. from 300 p.p.m. for 2 days. At the fourth acclimation, the concentration dropped to 15 p.p.m. from 500 p.p.m. for 4 days. Thus, the activated sludge capable of assimilating the hydrolyzed copolymer was obtained in total 12 days.

Then an aqueous solution including 500 p.p.m. of the hydrolyzed copolymer, 70 p.p.m. of urea and 26 p.p.m. of potassium dihydrogenphosphate was added with the activated sludge acclimated in a concentration of 3,000 p.p.m. and continuously treated for one month in the same manner as in Example 1. The residence time in the aeration tank was 8 hours. During the treatment, the concentration of the hydrolyzed copolymer of the treated liquid was within the range of 25 to 15 p.p.m.

EXAMPLE 15

The acclimation was carried out in the same manner as in Example 1 except that hydrolyzed vinyl acetate-methyl acrylate copolymer (vinyl acetate content: 95% by mole, degree of hydrolysis in vinyl acetate unit: 90% by mole) was included in the aqueous solution instead of polyvinyl alcohol.

At the first acclimation, the concentration of the hydrolyzed copolymer dropped to 2 p.p.m. from 50 p.p.m. for 3 days. At the second acclimation, the concentration dropped to 5 p.p.m. from 100 p.p.m. for 3 days. At the third acclimation, the concentration dropped to 15 p.p.m. from 300 p.p.m. for 3 days. At the forth acclimation, the concentration dropped to 20 p.p.m. from 500 p.p.m. for 3 days. Thus, the activated sludge capable of decomposing the hydrolyzed copolymer was obtained in total 12 days.

EXAMPLE 16

An aqueous solution having a composition corresponding to that of a warp desizing waste water was prepared. That is to say, the solution including 250 p.p.m. of corn starch, 50 p.p.m. of a wax, 100 p.p.m. of p.p.m. of urea, 40 p.p.m. of potassium dihydrogenphosphate, 500 p.p.m. of sodium acetate, 250 p.p.m. of methanol and 100 p.p.m. of polyvinyl alcohol (degree of polymerization: 1,700, degree of hydrolysis: 87% by mole) was prepared. Thus prepared solution had the COD of 380 p.p.m.

The first acclimation was carried out in the same manner as in Example 1 except that the above aqueous solution was employed and the activated sludge was added to the aeration tank at a concentration of 6,000 p.p.m. The COD dropped to 58 p.p.m. after 2 days and dropped to 16 p.p.m. after 7 days.

Then the second acclimation was successively carried out with supplying into the aeration tank the same aqueous solution as the above except that the concentration of polyvinyl alcohol was 200 p.p.m. After 3 days, the COD dropped to 20 p.p.m. from 170 p.p.m.

Further the third acclimation was successively carried out with supplying into the aeration tank the same aqueous solution as the above except that the concentration of polyvinyl alcohol was 300 p.p.m. After 3 days, the COD dropped to 26 p.p.m. from 250 p.p.m. At this stage, the acclimation of the activated sludge was finished.

Then the same aqueous solution as the above except that the concentration of polyvinyl alcohol was 500 p.p.m. was continuously treated for one month by successively supplying it into the aeration tank. During the treatment, the COD of the treated liquid was within the range of 18 to 30 p.p.m. and the concentration of polyvinyl alcohol was within the range of 6 to 12 p.p.m.

What we claim is:

1. A process for the preparation of an activated sludge capable of assimilating a solution of polyvinyl alcohol resins which comprises subjecting an ordinary activated sludge to acclimation under conditions of 15° to 35°C. in temperature, 7.0 to 8.5 in pH and 1 to 6 p.p.m. in dissolved oxygen for 5 to 15 hours with agitation in a prepared by dissolving at least one member selected from the group consisting of polyvinyl alcohol having not less than 70% by mole of a degree of hydrolysis, water-soluble acetalizated polyvinyl alcohol, water-soluble urethanated polyvinyl alcohol, water-soluble hydrolyzed copolymer of vinyl acetate and ethylene or propylene water-soluble hydrolyzed copolymer of vinyl acetate and maleic acid, crotonic acid, acrylic acid or acrylic amide, partially acetalizated one of the above hydrolyzed copolymers and urethanated one of the above hydrolyzed copolymers in an amount of 0.005 to 0.6 kg./kg. mixed liquor suspended solid/day and at least one solution selected from the group consisting of acetic acid, propionic acid, potassium, sodium, calcium or ammonium salts thereof, methyl, ethyl, propyl or butyl esters thereof, amides thereof, malic acid, citric acid, fumaric acid, oxalic acid and lactic acid, in the range of biochemical oxygen demand loading of 0.05 to 0.3 kg./kg. mixed liquor suspended solid/day.

2. The process of claim 1, wherein the amount of said polyvinyl alcohol resin is increased stepwise from less amount to more amount within the range of 0.005 to 0.6 kg./kg. mixed liquor suspended solid/day every 85% or more drop of chemical oxygen demand of the aqueous solution.

3. The process of claim 1, wherein said nutrient is a member selected from the group consisting of acetic acid, potassium acetate, sodium acetate, ammonium acetate.

4. The process of claim 1, wherein said aqueous solution is a waste water containing polyvinyl alcohol resins.

5. A process for treating a waste water effluent containing a polyvinyl alcohol resin which comprises passing the waste water through the activated sludge acclimated according to claim 1.

* * * * *

UNITED STATES PATENT OFFICE
CERTIFICATE OF CORRECTION

Patent No. 3,926,796    Dated December 16, 1975

Inventor(s) YUKIO FUJITA ET AL

It is certified that error appears in the above-identified patent and that said Letters Patent are hereby corrected as shown below:

On column 8, line 37: before "prepared" insert --solution--.

On column 8, line 43: after "propylene" insert --,--.

Signed and Sealed this thirtieth Day of March 1976

[SEAL]

Attest:

RUTH C. MASON
Attesting Officer

C. MARSHALL DANN
Commissioner of Patents and Trademarks